(No Model.)

W. T. FORBES.
EXTRACTING APPARATUS.

No. 531,108. Patented Dec. 18, 1894.

Witnesses
Inventor
W. T. Forbes
By H. A. Seymour
Attorney (No Model.) 2 Sheets—Sheet 2.

W. T. FORBES.
EXTRACTING APPARATUS.

No. 531,108. Patented Dec. 18, 1894.

Witnesses
E. Nottingham
G. F. Downing

Inventor
W. T. Forbes
By H. A. Seymour
Attorney

UNITED STATES PATENT OFFICE.

WALTER T. FORBES, OF ATLANTA, GEORGIA.

EXTRACTING APPARATUS.

SPECIFICATION forming part of Letters Patent No. 531,108, dated December 18, 1894.

Application filed January 20, 1894. Serial No. 497,513. (No model.)

*To all whom it may concern:*

Be it known that I, WALTER T. FORBES, of Atlanta, in the county of Fulton and State of Georgia, have invented certain new and useful Improvements in Apparatus for Treating Oleaginous and Fibrous Materials; and I do hereby declare the following to be a full, clear, and exact description of the invention, such as will enable others skilled in the art to which it appertains to make and use the same.

My invention relates to an improvement in apparatus for treating oleaginous and fibrous materials—the object of the invention being to construct the apparatus in such manner that the material will be treated in a rapid and effectual manner.

A further object is to not only so construct the apparatus that the time required to properly treat the material will be small, but so that the results accomplished will be improved with the expenditure of a minimum amount of power.

A further object is to provide simple and efficient means whereby the apparatus can be easily charged.

With these objects in view the invention consists in certain novel features of construction and combinations and arrangements of parts as hereinafter set forth and pointed out in the claim.

Figure 1:
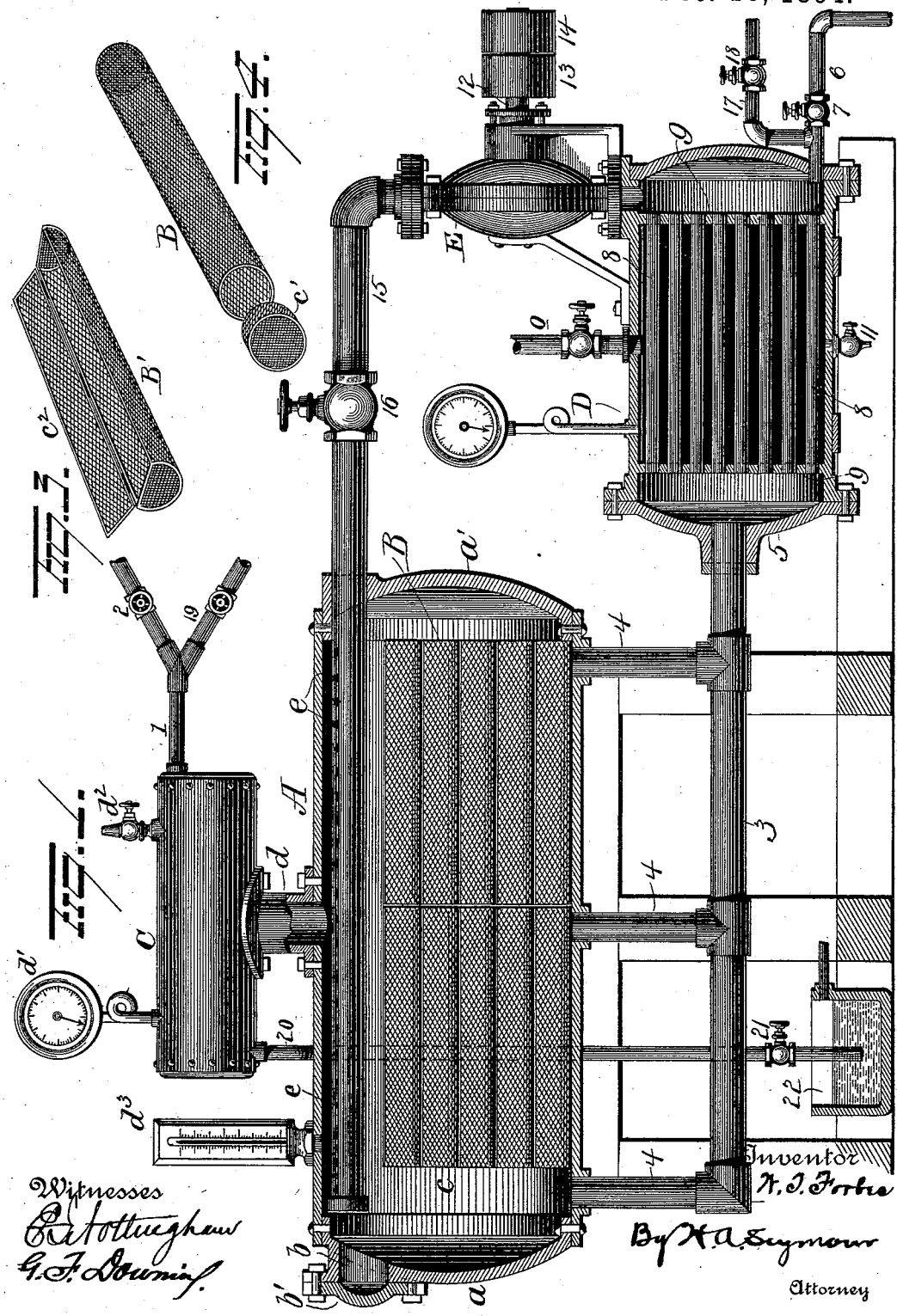
Figure 2:
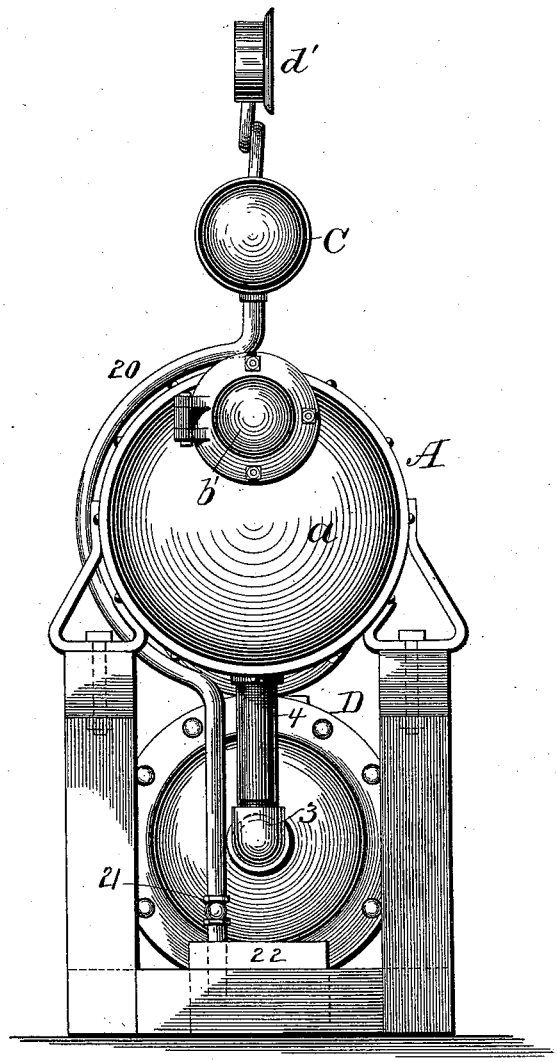

In the accompanying drawings: Figure 1 is a longitudinal sectional view illustrating my improvements. Fig. 2 is an end view. Figs. 3 and 4 are detail views.

A represents a cylinder or digester made of heavy iron or steel and of a length somewhat greater than is sufficient for the accommodation of the baskets (hereinafter described) containing the material to be treated. The heads $a$, $a'$ of the cylinder or digester are preferably made of cast iron or steel or boiler plate, and the head $a$ will be made, preferably at a point at or near its top, with an opening $b$ of a size sufficient to permit a man to pass through its said opening being normally closed tightly, when the apparatus is in operation, by a hinged door $b'$.

The material to be acted upon will be placed in baskets B, and the baskets will preferably be made about six feet long and arranged within the cylinder or digester in two series disposed end to end. The cylinder or digester will be made about fifteen feet in length so as to leave a space $c$ of about three feet at one end thereof beyond the baskets. The operator having passed through the opening $b$ will occupy the space $c$ and receive the baskets of material through said opening and properly place them in position in the cylinder or digester. After the cylinder or digester shall have been filled the operator will pass out through the opening $b$ and tightly close the door $b'$.

In treating cotton seed or other oleaginous material for the purpose of extracting the oil therefrom, I prefer to use baskets B of wire netting made cylindrical in form and having an end cap $c'$, as shown in Fig. 4. When the apparatus is to be used for the treatment of hemp, jute, ramie, *Sida retusa* or other fibrous growth, I prefer to employ baskets B' made in the form shown in Fig. 3, having lids $c^2$.

Disposed over the cylinder or digester A and connected therewith by a short pipe $d$, is a drum or dome C, with which a pipe 1 having a valve 2, communicates, for the purpose of conducting the fluid to be employed thereto and from the drum or dome C said fluid passes into the cylinder or digester to act upon the material therein. A gage $d'$ and a petcock $d^2$ communicates with the drum C and on the cylinder or digester, a thermometer $d^3$ is preferably located.

A pipe 3 is disposed beneath the cylinder or digester A and preferably in comparatively close proximity thereto, said pipe communicating with the cylinder or digester by three (more or less) short pipes 4. One end of the pipe 3 is closed and the other end communicates with the shell 5 of the heater D, which is disposed below the top of the digester. With the other end of the shell of the heater, at the bottom thereof, a discharge pipe 6 communicates for a purpose hereinafter explained, and said discharge pipe is provided with a valve 7. Within the shell of the heater a series of pipes or flues 8 are located and supported by suitable perforated plates or disks 9 disposed in proximity to the ends of the shell of the heater and through these pipes or flues the fluid to be heated is adapted to pass. Heat is applied to the heater D by means of steam, which enters the shell 5 by a valved pipe o and envelops the pipes or flues 8 between the plates or disks 9, the steam finding an exit through a valved pipe 11.

A centrifugal pump E is located on the end of the heater farthest removed from the cylinder or digester A and communicates with said heater so as to receive the fluid passing from the cylinder or digester A through the heater. The shaft 12 of the centrifugal pump is provided with tight and loose pulleys 13, 14, over which a strap from any convenient source of power is adapted to pass. With the top of the centrifugal pump E, one end of a pipe 15 having a valve 16 communicates, the other end of said pipe communicating with a pipe F disposed in the upper portion of the cylinder or digester and provided with a number of perforations e.

In order that the fluid above referred to shall rapidly attain the desired temperature, I prefer to make the combined area of the flues 8 of the heater about twenty-six times greater than the area of the perforated pipe F.

When it is desired to subject cotton seed to the action of the apparatus for the purpose of extracting the oil, the seed will first preferably be hulled, the kernels finely chopped by passing them between finely corrugated rolls or in any other suitable manner. The material will then be placed in baskets and the baskets inserted into the cylinder or digester in the manner above explained. The cylinder or digester having been charged with seed, cold naphtha will be permitted to flow into the same through the drum C until the cylinder or digester and the heater become filled, when the supply of naphtha will be closed. The valve 16 in the pipe 15 will then be opened and the centrifugal pump E started, which acts to cause the fluid to pass from the heater through the pipe 15 and into the perforated pipe F, from which it will be discharged through the perforations therein onto the seed in the digester. The charge of naphtha is thus made to circulate through the apparatus, being properly heated as it passes through the heater, extracting or dissolving the oil in the seed as it passes through the cylinder or digester. This circulation of the naphtha will be continued until the naphtha has taken up or dissolved all the oil it will carry, or, in other words, until it becomes completely saturated with oil. The naphtha and oil will then be drawn off through the discharge pipe 6. Another charge of naphtha will then be made to circulate in the same manner and so on until all the oil has been removed from the seed. The baskets will contain about fifty pounds each of cotton seed kernels when first inserted into the cylinder or digester. It may be found desirable to simply chop up the cotton seed and leave the hulls and kernels together. This can be done but the bulk will be increased and will result in a decrease of oil per charge.

By the method of employing naphtha for dissolving the oil in the seed as above explained, I am enabled to use a minimum quantity of naphtha for the production of a maximum amount of oil.

It has heretofore been proposed to compel a circulation of fluid through the material in the digester and through a heater by means of a pump located between the outlet of the digester and the heater. Such an arrangement has been found to be objectionable owing to the excessive amount of work put upon the pump in forcing the fluid through the heater, resulting in a considerable loss of time. By arranging the pump between the heater and the inlet of the cylinder or digester so that the fluid will enter the pump after having already passed through the heater, as above explained, I have found by experience, that at least fifty per cent. of time is saved in the treatment of the material. The heater being disposed below the top of the cylinder or digester and the latter being normally filled, the fluid will enter the heater and pass through its flues, by its own gravity, thus relieving the pump of the duty of forcing said fluid through the heater, the work performed by the pump being simply to force the fluid from the heater through the perforated pipe in the digester, which work is comparatively light. It will be seen that as the pump causes the fluid to flow from the heater to the digester, the heater is being continually replenished by fluid flowing thereinto by its own gravity.

As the location of the pump relatively to the digester and heater results in a great saving of time in the treatment of a given quantity of material, such arrangement is of vast importance.

When the seed shall have become exhausted of oil, the naphtha remaining in the residuum will be removed by means of steam which will enter the discharge pipe 6 by a pipe 17 (having a valve 18) and, after passing through the heater will enter the digester through the pipes 3, 4. In passing through the digester it will take up such naphtha as remains in the residuum and, after passing through the drum C, will escape into the inlet pipe 1, from which it will pass, through a valved pipe 19 to a suitable condenser.

As above mentioned, my apparatus is equally well adapted to the treatment of fibrous growths, such as hemp, jute, ramie, *Sida retusa*, &c., in which case the fiber will be placed in baskets such as shown in Fig. 3, and a degumming solution will be made to circulate through it in the same manner as above explained.

The apparatus can also be employed for removing grease from wool. The wool will be placed in fine meshed baskets and treated in the same manner as above described in connection with the treatment of cotton seed.

It has been found that more or less condensation takes place in the drum or dome C and for the purpose of removing the same, I provide a pipe 20 communicating at one end with the bottom of said drum or dome and provided with a valve 21. The pipe 20 is preferably made to pass about the cylinder or digester A, and is adapted to discharge into a vat 22.

Having fully described my invention, what I claim as new, and desire to secure by Letters Patent, is—

The combination with a digester having a dome in communication therewith, a pipe leading into the dome, a branch pipe leading into the first mentioned pipe, and valves in said pipes, of a heater below the digester, pipes leading from the digester into the heater, a pump, a pipe leading from the pump into the digester, a discharge pipe leading from the heater, a steam pipe in communication with the discharge pipe, and valves in said pipes, substantially as set forth.

In testimony whereof I have signed this specification in the presence of two subscribing witnesses.

WALTER T. FORBES.

Witnesses:
 ORESTES CLEVELAND,
 ARTHUR L. HOUSTON.